April 29, 1941.  E. A. LARSSON  2,239,823
CAR COUPLER
Filed Nov. 25, 1939
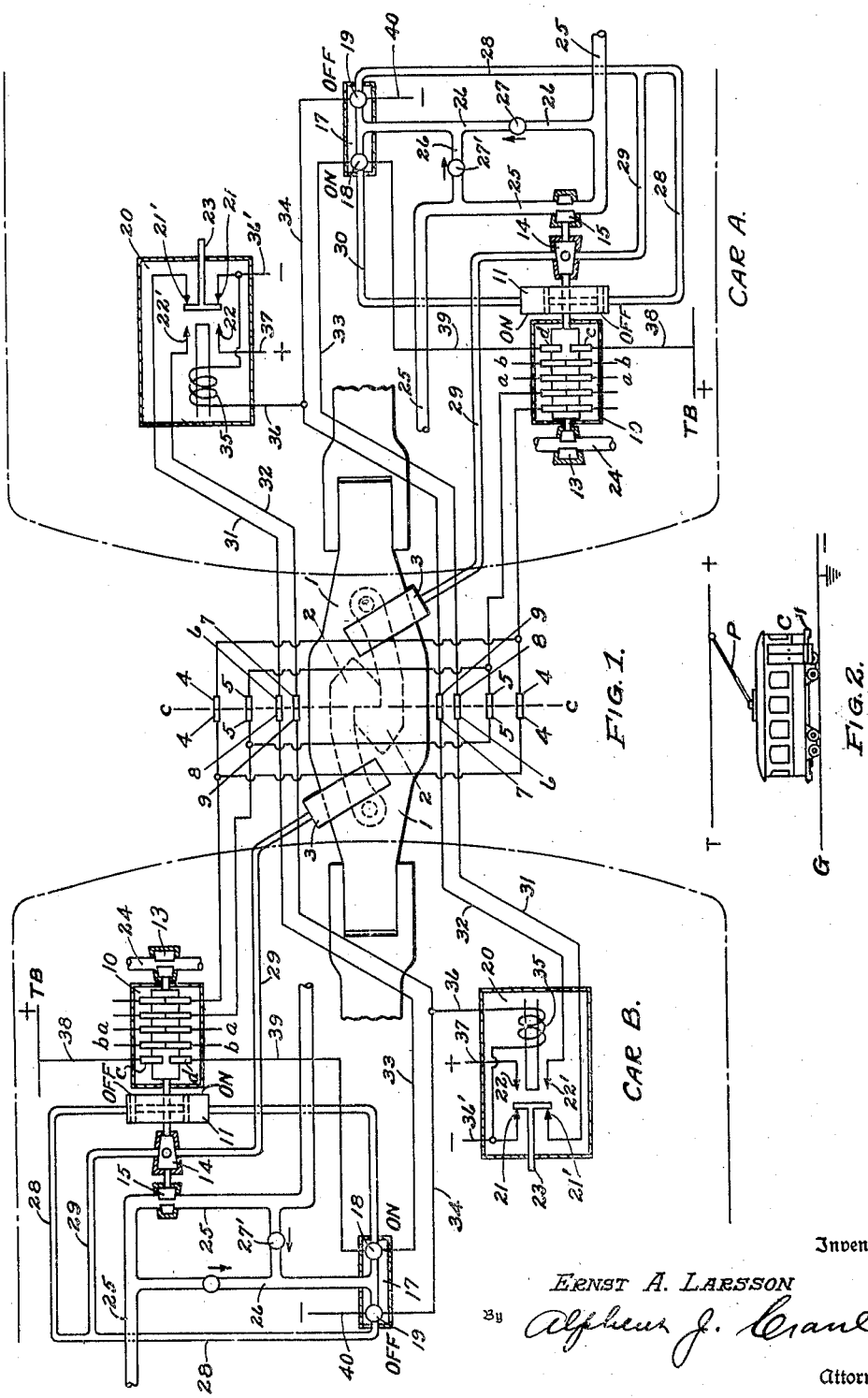
Inventor
ERNST A. LARSSON
By Alpheus J. Crane
Attorney Patented Apr. 29, 1941

2,239,823

UNITED STATES PATENT OFFICE 2,239,823

CAR COUPLER

Ernst A. Larsson, Mansfield, Ohio, assignor to The Ohio Brass Company, Mansfield, Ohio, a corporation of New Jersey Application November 25, 1939, Serial No. 306,130

20 Claims. (Cl. 173—332)

My invention relates to couplers for cars including car, electric and fluid pressure coupling means.

One object of my invention is to provide a system whereby the electric train line wires and the fluid pressure train pipes on two cars may be automatically connected when two cars are brought together.

Another object of my invention is to automatically complete the electric circuits and fluid pressure train pipe circuits through the coupled cars upon the circuits and pipes being automatically connected at the couplers when the cars are brought together.

Another object of my invention is to provide a system having manual uncoupling control for the car couplers and to return the system otherwise to its normal uncoupled condition including means for preventing the system returning to its fully coupled condition after manually uncoupling the cars until the coupled cars are separated and all connections therebetween broken.

My invention is set forth in the combination and arrangement of the parts shown in the accompanying drawing and described in the following specification, and is particularly set forth in the appended claims.

In the drawing:

Fig. 1 shows a schematic or diagrammatic view of my invention as applied to the adjacent ends of two coupled cars and all apparatus shown in its operative condition with the cars in condition to be moved.

Fig. 2 shows a car C taking current through a trolley pole P from a single trolley wire T and a ground return G. This figure is indicative of the manner in which current may be supplied to the cars for operating my improved system.

I have not shown in detail the construction of the car coupler, the electric coupler or the other parts of my system as I am not claiming such couplers and parts to be new and the arrangement of the electric and air coupling apparatus may be combined in a single unit known as an electric and air coupling head and suspended below the car coupler head in the manner shown in my Patent 1,785,269 of December 16, 1930, of which this application is an improvement.

According to my disclosure, I show the adjacent ends of two cars A and B in coupled relation. As far as possible I employ the same numerals to represent the same parts on the two cars as they are equipped in duplicate.

Each car is provided with a car body upon which is mounted a car coupler I which may be of any suitable type, which preferably will automatically couple on impact. In my disclosure I show a Miller-hook type of coupler on each car and each coupler provided with a hook 2 and an air operated uncoupling mechanism 3 which may be merely a cylinder with a piston mounted therein which acts upon the associated hook to move it to the uncoupling position when air is admitted to the cylinder.

The electric coupler head mounted preferably below the car coupler head, is provided with a plurality of electric contacts 4, 5, 6, 7, 8 and 9, and as many more as necessary to meet requirements as, for instance, for lighting and heating circuits $a$ and $b$ respectively. The contacts 4 and 5 on each car are cross connected, as shown, which permits like contacts on one car controlled by the drum switch (later explained) to be connected to like contacts on the coupled car. This cross connecting is not necessary with the contacts 6, 7, 8 and 9, as they connect to different circuits on the coupled cars, that is, 6 and 8 are connected together and likewise 7 and 9.

My invention also includes a drum switch 10, or other approved type used to open and close the various electric circuits connected to the electric coupler contacts or other circuits. The switch 10 is operated by an air engine 11 which may be of any approved type to meet requirements; I show a single cylinder type which operates the switch to its "on" or "off" positions, depending upon the application of the air thereto.

Also, operated by the engine 11 are air valves or cocks 13, 14 and 15. These valves may be independent of each other or combined as desired; I show the valves 14 and 15 connected to the engine 11 while valve 13 is connected to the switch 10 as a matter of convenience. These valves operate only in synchronism with the switch 10 and control the air flow through the train pipes, some or all of which may connect to like train line pipes on the coupled car through coupling means associated with the car coupler 1, as shown in the aforesaid Larsson Patent 1,785,269.

The air for operating the engine 11 is controlled by an electropneumatic valve 17 comprising the "on" valve 18 and the "off" valve 19 whereby the "on" valve operates the engine 11 to the "on" position which is a closed position for the switch 10 and the "off" valve operates to the contrary.

To control the operation of the electropneumatic valve 17 to its "off" position, I make use of the coupling switch 20. This switch is provided with a pair of normally closed contacts 21—21' and a second pair of normally opened contacts 22—22'. The switch 20 may be manually operated by pressing the button 23 to open the contacts 21—21' and to close the contacts 22—22' and it is also automatically operated when the coil 35 is energized through the manual operation of the switch 20 on the coupled companion car.

The valve 13 may be said to control the flow of air through the brake line 24 and it is closed when the switch 10 is open. The valve 15 controls the flow of air through the reservoir pipe 25 and is closed when the switch 10 is open. The valve 14 controls the air to the uncoupling mechanism and is closed when the switch is closed.

The electropneumatic "off" valve 19 is connected to the reservoir air line 25 by the pipe 26 in which are check valves 27—27' to prevent back flow and is connected to the "off" end of the air engine 11 by the pipe 28.

A branch pipe 29 connects the "off" valve 19 to the uncoupling mechanism 3 and this pipe is controlled by the valve 14.

The "on" valve 18 is connected to the air engine 11 by the pipe 30 whereby the opening of the "on" valve 18 will operate the air engine which in turn will close the switch 10 and open the valves 13 and 15 and close the valve 14. The opening of the "off" valve 19 will operate the engine 11 to open the switch 10, close the valves 13 and 15 and open the valve 14.

To operatively connect the switches 20 with the electropneumatic valve 17 and switch 20 on the coupled car, the contacts 21' are connected by the conductors 31 to the coupler contacts 6 and the contacts 22' are connected to the coupler contacts 7 by the conductors 32. The "on" valves 18 are connected to the coupler contacts 8 by the conductors 33 while the "off" valves are connected to the contacts 9 by the conductors 34.

The coils 35 are connected through the conductor 36 to the conductor 34 and to the negative of a source of supply or to a ground depending whether the system is operated from the trolley wire as in a grounded street car system or an ungrounded trolley bus system or from a separate source of current supply on the car as, for instance, a storage battery. The contacts 21 are also connected to the negative of the same source of current supply through the conductor 36'. The contacts 22 receive current from the trolley or other source of supply through the conductors 37 and 34 when the contacts 22—22' are closed on the coupled car.

In my improved system herein shown and described, a source of current supply is assumed to be the positive trolley wire and a grounded negative as in the case of the ordinary street car in which the current is lead from the trolley wire T through the pole P to the bus line TB on each car to ground.

The switch 10 is provided with two contacts c and d and connected to the bus TB and to the "on" valve 18 by the conductors 38 and 39 respectively. When the drum switch 10 is closed the contacts c—d are opened but are closed when the switch and the other contacts on the switch are open.

From this it will be evident that when two cars are in uncoupled relation the switch 10 will be open but the contacts c—d closed and, therefore, the coupler contact 8 will be connected to the source of current supply TB through the conductor 38, contacts c—d, conductor 39, "on" valve 18 and conductor 33.

When two cars are brought together as shown in Fig. 1 current will at once flow from the trolley wire T through the bus line TB on the car A, conductor 38, contacts c—d, conductor 39, "on" valve 18, conductor 33, coupler contacts 8 and 6, conductor 31 on car B, contacts 21'—21, conductor 36' to ground, thus completing the circuit and opening "on" valve 18. Air will now flow from the reservoir line 25 on car A through pipe 26, check valve 27, "on" valve 18, pipe 30 into engine 11 and operate the engine to its "on" position which will at the same time operate the switch 10 to its closed position thus opening the contacts c—d and closing the other contacts on the switch 10, also opening valves 13 and 15 but closing valve 14.

This operation is repeated on car B, since both cars are equipped in duplicate thus automatically placing the cars in operative condition with the air free to flow from car to car and the electric circuits completed.

When desired to uncouple the cars the button 23 of switch 20 on either coupled car, for example car A, is operated thus opening contacts 21—21' and closing the contacts 22—22' thereby completing the circuit through the "off" valve 19 on car B as current will now flow through conductor 37 (connected to bus line TB), contacts 22—22', conductor 32, coupler contacts 7 and 9, conductor 34 on car B, "off" valve 19 and conductor 40, thus energizing and opening the "off" valve 19 on car B. Air will now flow from the reservoir line 25 on car B through pipe 26 and check valve 27, "off" valve 19, pipe 28 to the air engine 11 operating it and the switch 10 on car B to their "off" and "open" position respectively thereby opening the circuits through the switch 10 on car B, but closing the contacts c—d, also closing valves 13 and 15 and opening valve 14, all on car B.

Upon manually closing switch 20 on car A, the coil 35 on car B will be energized thus opening the contacts 21—21' and closing the contacts 22—22' and current will flow then through switch 20 on car B, conductor 32, coupler contacts 7 and 9, conductor 33 on car A, "off" valve 19, thus opening the valve 19 and effecting an operation of the engine 11, switch 10 and valves 13, 14 and 15, as described for car B.

The coil 35 on each car will be energized upon the energization of conductor 34 and will open the contacts 21—21' and close the contacts 22—22' which conditions are maintained until the coils 35 are de-energized. The opening of the contacts 21—21' will prevent the further automatic operation of the system to its coupled condition while the cars are still coupled and the contacts 6 and 8 connected. As soon as the cars are separated, the coils 35 are de-energized and the switches 20 returned to normal, thus placing the system in condition for again automatically coupling when the cars are brought together.

When air flows into the pipe 23 on each car during the uncoupling operation, it also flows through the branch pipes 29 and valve 14 to the uncoupling mechanism 3 thus moving the hooks 2 to their uncoupled relation and the hooks will be held open as long as the coupler heads remain in coupled position due to the energization of the coils 35 which close the contacts 22—22' which in turn control the energization of the "off" valves 19. As soon as the cars are separated and the contacts 6 and 8 disconnected, the "off" valves 19 are de-energized and closed and the air is shut off to the uncoupling mechanism and the hooks returned to their coupling position.

As is common practice, "off" and "on" valves of the electropneumatic valve 17 are arranged to open to atmosphere when the supply line is closed in order to bleed the supplied lines 28 and 30 of pressure. Valves of this character are shown in Tomlinson Patents 1,223,223 of April 17, 1917, and 1,381,852 of June 14, 1921.

There are modifications which will suggest themselves to those skilled in the art and which modifications will fall within the scope of my invention; therefore, I wish to be limited only by my claims.

I claim:

1. The combination with two cars, of a coupler for connecting said cars, mechanism on said cars having an "on" position adapted for coupled relation of said cars and an "off" position adapted for uncoupled relation of said cars, means operable while said cars are in coupled relation for setting said mechanism in its "off" position and for holding said mechanism in said position until said cars are separated, said means being automatically deenergized by separation of said cars.

2. The combination with two cars, of a coupler for connecting said cars, mechanism on said cars having an "on" position adapted for coupled relation of said cars and an "off" position adapted for uncoupled relation of said cars, means operable while said cars are in coupled relation for setting said mechanism in its "off" position and for holding said mechanism in said position until said cars are separated, said means comprising a manually and electrically operable control switch in each car, separate electric circuits connected with the control switch in each car for inciting the mechanism in the said other car, means connected with each circuit and set in operation thereby, when the control switch therefor is closed, for setting the said mechanism incited by that circuit in its "off" position and for closing the control switch of the other circuit so that when either switch is manually closed the other switch will be automatically closed and said circuits will mutually cooperate to hold both switches closed and retain said mechanism in its "off" position until said circuits are opened by separation of said cars.

3. The combination with two cars, of a coupler for connecting said cars, said coupler being releasable to permit separation of said cars, an electrically incited electric switch in each car, separate electric circuits for inciting said switches, the circuit for inciting each switch being controlled by the other switch, and means other than said circuits for operating one of said switches, said circuits extending from car to car and having their continuity maintained by said coupler and being opened when said cars are separated.

4. The combination with two cars, of a coupler for connecting said cars, said coupler being releasable to permit separation of said cars, an electric switch in each car biased to open position and manually operable to closed position, and electric circuits extending from car to car and having their continuity maintained by said coupler, one of said circuits being controlled by each switch for closing the other switch so that when one of said switches is manually closed the other will be automatically closed and both will be retained in closed position until said circuits are broken by separation of said cars.

5. The combination with two cars, of a coupler for connecting said cars, said coupler being releasable to permit separation of said cars, an electric switch in each car biased to open position and manually operable to closed position, and electric circuits extending from car to car and having their continuity maintained by said coupler, one of said circuits being controlled by each switch for closing the other switch so that when one of said switches is manually closed the other will be automatically closed and both will be retained in closed position until said circuits are broken by separation of said cars and mechanism on said cars operable to uncoupling position by said circuits and retained in said position until said circuits are broken by separation of said cars.

6. The combination with two cars, of a coupler for connecting said cars, an electric switch in each car, an "off" circuit and an "on" circuit connected with each of said switches and controlled thereby, said circuits being maintained continuous from car to car by said coupler while said cars are connected and being broken when said cars are separated, said switches being biased to close said "on" circuits and to open said "off" circuits, manually operable means for reversing said switches, the "off" circuit of each switch acting to reverse the other switch when the controlling switch is reversed manually so that upon manual operation of either switch, both switches will be reversed, said circuits being arranged to retain both switches in reversed position until said circuits are broken by separation of said cars, and mechanism carried by said cars and operable to "off" and "on" positions by said "off" and "on" circuits respectively, said mechanism being arranged to open said "on" circuits when moved to its "on" position.

7. The combination with two cars, of a coupler for connecting said cars, uncoupling means for said cars, an electric control circuit for said uncoupling means having parts thereof in each of said cars, said parts being connected through said coupler to form a closed circuit which is broken by separation of said cars and a switch for closing said control circuit, said uncoupling means being incited by said control circuit to retain said coupler in uncoupled condition after said switch has been closed until the parts of said control circuit are separated by separation of said cars.

8. The combination with two cars, of coupling means for said cars, a train line having a part thereof in one car connected to a part in the other car when said cars are connected together, a cut-off device for said train line having an "on" position for establishing continuity of said train line in one car; and an "on" electric circuit for said cars for setting said cut-off device in its "on" position when said circuit is energized, said circuit comprising a normally continuous portion in one car connected with one terminal of a source of power and a normally continuous portion in the other car connected with the other terminal of said source and means for joining said portions when said cars are coupled to complete the circuit between said terminals and set said cut-off device in its "on" position.

9. The combination with two cars each having a train line therein, of means for coupling said cars together and connecting said train lines, a shut off device for the train line in each car normally set to prevent flow through said lines when said cars are uncoupled, and means automatically operable by coupling said cars together for shifting said shut off devices to establish flow through the connected train lines.

10. The combination with two cars each having a train line therein, of means for coupling said cars together and connecting said train lines, a shut off device in each car for shutting off flow through the train line therein, an electric circuit having a portion thereof in each car, means for joining the portions of said circuit when said cars are coupled to close said circuit and establish flow of current therein, and means actuated by said current for shifting said shut off device to establish flow through said train lines.

11. The combination with two cars each having an electric train line therein, of means for coupling said cars together and connecting said train lines, a switch in each car for controlling the train line therein, said switches being normally open when said cars are uncoupled and means automatically operable by coupling of said cars together for closing said switches to establish current flow through said connected train lines, said last named means comprising an electric circuit having a part thereof in each car, the part in each car being continuous when the train line switch in that car is open, said parts being joined by coupling said cars together to form a closed circuit and establish current flow therein for actuating said automatically operable train line switch closing means.

12. The combination with two cars each having a fluid pressure train line therein, of means for coupling said cars together and connecting said train lines, a valve in each car for controlling the fluid flow in the train line therein, said valves being normally closed when said cars are uncoupled and means automatically operable by coupling said cars together for opening said valves to establish fluid flow through said connected train lines, said last named means comprising an electric circuit having a part thereof in each car which is normally continuous when the valve in that car is closed, said parts being joined by coupling said cars together to form a closed circuit and to establish current flow in said circuit for actuating said automatically operable valve opening means.

13. The combination with two cars each having an electric train line and a fluid pressure train line therein, of means for coupling said cars together and connecting said respective train lines, a switch in each car for controlling the electric train line in that car, a valve in each car for controlling the fluid pressure train line in that car, actuating means in each car for operating the valve and switch therein and a separate electric circuit for controlling the actuating means in each of said cars, each electric controlling circuit comprising two parts that are normally continuous when said cars are uncoupled, one part of each circuit being situated in each of said cars, and contact members carried by said coupling means for joining the respective parts of each controlling circuit and automatically completing said controlling circuits when said cars are coupled together to cause current to flow in said controlling circuits and operate said actuating means to close said switches and open said valves.

14. The combination with two cars, of a coupler for connecting said cars together, uncoupling means for said cars having an uncoupling position in which said cars are free to be separated and an inactive position in which said cars may be coupled, a control circuit for said uncoupling means by which said uncoupling means is incited to its uncoupling position when said control circuit is energized, a switch for closing said control circuit, said control circuit having parts thereof in each of said cars, said parts being connected through said coupler to form a closed circuit for retaining said uncoupling means in uncoupling position when said switch is closed and said cars are together, said circuit however being broken by separation of said cars to permit said uncoupling means to return to its inactive position.

15. The combination with two cars, of a coupler for connecting said cars, an uncoupler, actuating means for said uncoupler and an electric control circuit for said actuating means, said control circuit having a portion thereof in each car, said portions being connected to close said control circuit while said cars are in coupled position but automatically separated by separation of said cars to open said circuit and free said actuating means from control thereby.

16. The combination with two cars, of a coupler for connecting said cars, mechanism on each of said cars having a coupling and an uncoupling position and means for retaining said mechanism in uncoupling position, said retaining means comprising a circuit having a portion thereof in each of said cars, said portions being connected together to close said circuit when said cars are in coupled relation but being automatically separated to open said circuit when said cars are separated.

17. The combination with two cars, of a coupler for connecting said car, a lock for said coupler, means for releasing said lock and means for retaining said lock in released position until said cars are separated, said retaining means comprising an electric circuit having a portion thereof in each of said cars, said portions being joined by contacts on said coupler when said cars are coupled to close said circuit and retain said circuit closed until said cars are separated, said circuit being opened by the separating of said cars to de-energize said lock releasing means.

18. The combination with two cars, of a coupler for connecting said cars, train line circuits connected by said coupler, a shut off device for preventing flow through said train line circuits and means for adjusting said shut off device to "on" and "off" positions, said means comprising an electric circuit for retaining said shut off device in its "off" position after it has been adjusted to this position until said cars are separated, said circuit extending through said coupler and being interrupted by separation of said cars.

19. The combination with two cars, of a coupler for connecting said cars, a lock for said coupler, a train line circuit having portions thereof in each car connected through said coupler, a shut off device for preventing flow through said train line circuit, said shut off device having an "on" and an "off" position and mechanism for unlocking said coupler, for moving said shut off device to its "off" position and for retaining said coupler unlocked and said interrupter in its "off" position until said cars are separated, said mechanism comprising a control circuit extending through said coupler and opened by separation of said cars.

20. The combination with two cars, of a coupler for said cars, a train line circuit having a portion in each of said cars, said portions being connected through said coupler, a shut off device in said train line circuit having an "on" and an "off" position, an "on" circuit extending through said coupler for effecting movement of said shut off device to its "on" position, an "off" circuit extending through said coupler for effecting movement of said shut off device to its "off" position, a common switch for controlling said "on" and "off" circuits, said switch being biased to close said "on" circuit, but manually operable to close said "off" circuit and a control circuit extending through said coupler for retaining said switch in position to close said "off" circuit when manually operated to said position until said cars are separated, said control circuit being opened by separation of said cars to permit return of said switch to the position to which it is biased.

ERNST A. LARSSON.